(12) United States Patent
Miller et al.

(10) Patent No.: US 7,083,204 B1
(45) Date of Patent: Aug. 1, 2006

(54) COMPOSITE METAL PIPE COUPLING AND ASSEMBLY

(75) Inventors: Robert F. Miller, Lafayette, CA (US); Daniel D. Freitas, Manteca, CA (US)

(73) Assignee: Pacific Roller Die Company, Inc., Hayward, CA (US)

( * ) Notice: Subject to any disclaimer, the term of this patent is extended or adjusted under 35 U.S.C. 154(b) by 0 days.

(21) Appl. No.: 10/806,678

(22) Filed: Mar. 22, 2004

Related U.S. Application Data

(60) Provisional application No. 60/456,847, filed on Mar. 21, 2003.

(51) Int. Cl.
*F16L 47/00* (2006.01)
*F16L 25/00* (2006.01)

(52) U.S. Cl. .............................. 285/293.1; 285/286.1; 285/286.2; 285/290.1; 285/290.3; 285/290.4; 285/331; 285/420; 285/903

(58) Field of Classification Search ............ 285/285.1, 285/286.1, 286.2, 288.6, 290.1, 290.3, 293.1, 285/331, 399, 400, 403, 420, 253, 903, 290.4
See application file for complete search history.

(56) References Cited

U.S. PATENT DOCUMENTS

| 103,423 | A | * | 5/1870 | Brown ........................ 285/331 |
|---|---|---|---|---|
| 198,508 | A | * | 12/1877 | Dowling ..................... 403/337 |
| 214,812 | A | * | 4/1879 | Clark .......................... 285/331 |
| 283,975 | A | * | 8/1883 | Converse ................. 285/292.1 |
| 311,178 | A | * | 1/1885 | Duffy ......................... 285/226 |
| 652,396 | A | * | 6/1900 | Lovekin ..................... 285/328 |
| 1,267,313 | A | * | 5/1918 | Cook .......................... 285/330 |
| 1,467,064 | A | * | 9/1923 | Oleson ..................... 285/286.2 |
| 1,906,826 | A | * | 5/1933 | Smith et al. ................ 285/331 |
| 2,081,021 | A | * | 5/1937 | Smith et al. ............... 285/368 |
| 2,179,629 | A | * | 11/1939 | Hering ..................... 285/290.1 |
| 2,464,744 | A | * | 3/1949 | Fennema .................... 285/330 |
| 2,606,574 | A | * | 8/1952 | Lefebvre ..................... 285/55 |
| 2,867,454 | A | * | 1/1959 | Pollia ......................... 285/368 |
| 2,992,838 | A | * | 7/1961 | Wallace .................... 285/21.1 |
| 3,406,986 | A | * | 10/1968 | Jennings ................... 285/21.1 |
| 3,977,709 | A | * | 8/1976 | Hatzis ........................ 285/368 |
| 4,702,498 | A | * | 10/1987 | Mueller et al. ............... 285/55 |
| 4,763,932 | A | * | 8/1988 | Matz et al. ............. 285/148.17 |
| 5,401,062 | A | * | 3/1995 | Vowles ........................ 285/12 |
| 5,429,397 | A | * | 7/1995 | Kanao ..................... 285/290.3 |
| 5,709,414 | A | * | 1/1998 | Bailey et al. ............... 285/242 |

(Continued)

FOREIGN PATENT DOCUMENTS

JP 2-8588 * 1/1990

*Primary Examiner*—James M. Hewitt
(74) *Attorney, Agent, or Firm*—Philip A. Dalton

(57) ABSTRACT

A coupling for joining metal pipes or pipe sections end-to-end to form a pipe assembly. A plastic cuff is formed on one of the pipe ends and a mating, second plastic cuff is formed on the other pipe end. In one embodiment, a wire hoop is mounted over each pipe end, the hoops are rotatable around the associated pipe ends to align the hoops, and bolt assemblies spanning the two hoops are used to tighten the hoops axially, to thereby clamp the pipe ends and compress the cuffs between the pipe ends and provide a leak-proof joint. The cuffs are selected from configurations including tongue-and-groove and bell-and-spigot. The cuffs can be formed on the pipe ends in the shop, then the pre-cuffed pipe sections can be readily assembled into stable, leak-proof, corrosion-resistant lengths of pipe in the field.

9 Claims, 3 Drawing Sheets

U.S. PATENT DOCUMENTS

| | | | | |
|---|---|---|---|---|
| 5,876,070 A | * | 3/1999 | McNealy et al. | 285/55 |
| 5,944,362 A | * | 8/1999 | Harle | 285/148.14 |
| 6,581,984 B1 | * | 6/2003 | Seung-Kyu | 285/368 |
| 2003/0127848 A1 | * | 7/2003 | Campbell | 285/16 |

* cited by examiner

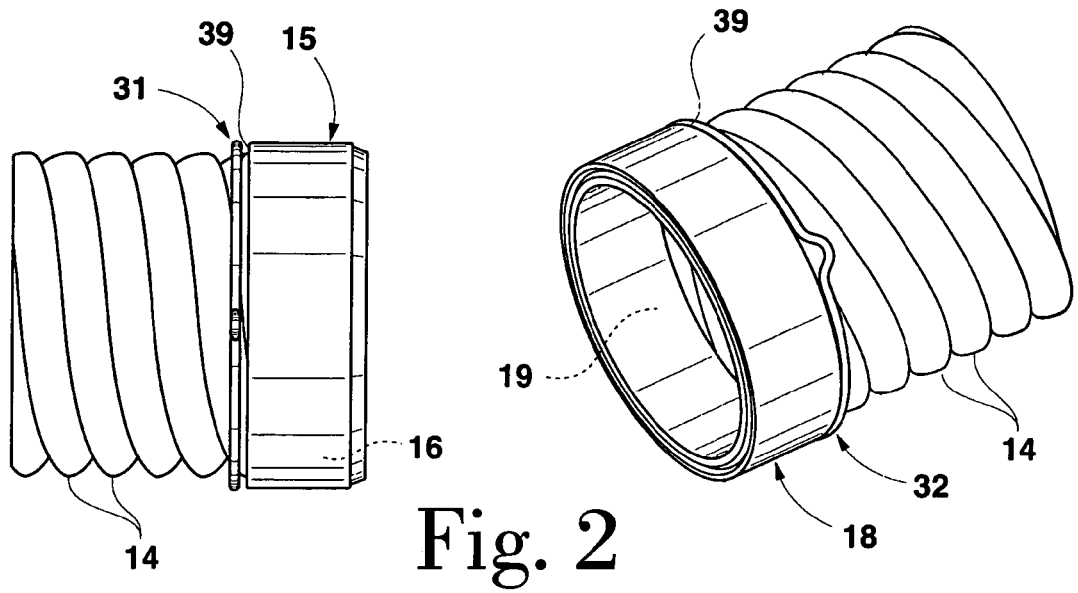
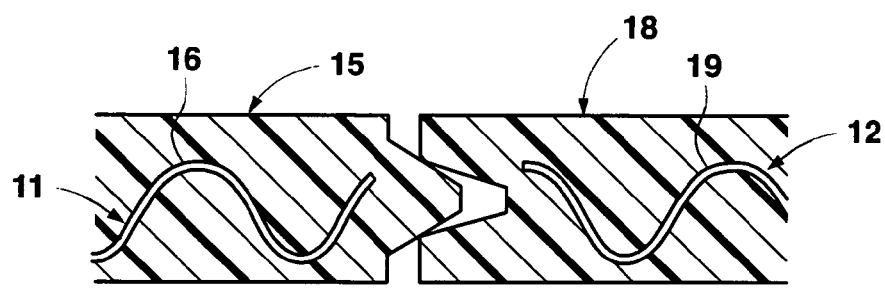
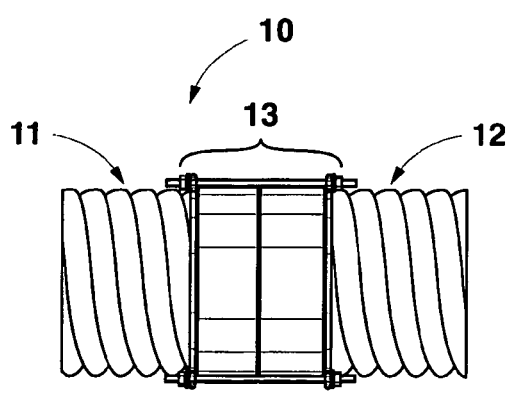
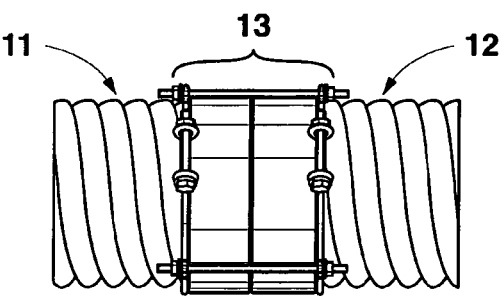
Fig. 2
Fig. 5
Fig. 1
Fig. 6

COMPOSITE METAL PIPE COUPLING AND ASSEMBLY

This application claims the benefit of U.S. provisional application No. 60/456,847, filed Mar. 21, 2003.

BACKGROUND OF THE INVENTION

1. Field of the Invention

The present invention relates to techniques and components for joining pipes, in particular, metal pipes.

2. Description of the Related Art

As used here, the word "coupling" and the phrase "pipe coupling" refer to components for joining relatively short pipes or tubes, especially metal pipes or tubes, typically for the purpose of forming an extended length of pipe. The requirements for such pipe couplings include a tight, preferably leak-proof seal between the adjoining pipe ends and corrosion protection for the bare metal of the pipe ends.

SUMMARY OF THE INVENTION

In one aspect, the present invention is embodied in components for joining pipe ends.

The present invention also is embodied in a coupling for joining pipe ends and in the resulting pipe joint and joined pipe sections.

In another aspect, the present invention is embodied in a pipe assembly, comprising first and second metal pipes having respective first and second ends; a first plastic cuff molded along the periphery of the first pipe end and a mating second plastic cuff molded along the periphery of the second pipe end. In a specific embodiment, the cuffs form a tongue and groove joint.

In yet another aspect, the present invention is embodied in a pipe assembly, comprising: first and second metal pipes having longitudinal axes and respective first and second ends; a first plastic cuff formed along the periphery of the first pipe end and a second plastic cuff formed along the periphery of the second pipe end, the first and second cuffs having a tongue and a groove, respectively, with the first, tongue cuff inserted into the second, groove cuff; first and second wire hoops mounted over the first and second pipe ends; and a plurality of bolt fasteners for tightening the first and second hoops and the first and second pipe ends axially, to seat the first and second pipe ends against the first and second cuffs, seat the first and second cuffs against one another, and seal the pipe ends against the cuffs.

In still another aspect, the present invention is embodied in a pipe assembly, comprising: first and second metal pipes having respective first and second ends; first and second plastic cuffs formed over the first and second pipe ends, respectively, with each cuff forming a shoulder; first and second wire hoops mounted around the first and second pipe ends, respectively; and a plurality of fasteners extending between the hoops and clamping the hoops against the shoulders and the first and second pipe ends against the first and second cuffs.

In another aspect, the present invention is embodied in a pipe assembly, comprising: first and second corrugated metal pipes having respective first and second longitudinal axes and respective first and second ends; a first plastic cuff formed along the periphery of the first pipe end and embedding the first pipe end therein and a mating second plastic cuff formed along the periphery of the second pipe end and embedding the second pipe end therein. Each of the first and second cuffs comprises a shoulder formed around the periphery of the associated first and second pipes; the first plastic cuff comprises a tongue, the second plastic cuff comprises a groove, and the first and second cuffs form a mating tongue and groove joint peripherally spanning the first and second pipe ends. Fastening means span the first and second shoulders and abut the first and second shoulders, for drawing the first and second pipe ends together axially and thereby sealing the first and second pipe ends along the tongue and groove joint.

In yet another aspect, the fastening means comprises first and second hoops and a plurality of bolts. The first and second hoops are mounted around the first and second pipe ends, respectively, and abut the first and second shoulders, respectively. Each hoop comprises a plurality of holes or ioops spaced apart around the hoop at intervals selected for aligning the holes of the first and second hoops by rotating the hoops about the longitudinal axes of the first and second pipes. The plurality of bolts extend between the hoops and through the aligned holes thereof for clamping the hoops against the shoulders, thereby drawing the first and second pipe ends together axially and sealing the first and second pipe ends along the tongue and groove joint.

In still another aspect, the first hoop further comprises a first gap; a first end of the first hoop being on one side of the first gap; a second end of the first hoop being on the opposite side of the first gap; and first means joining the first and second ends of the first hoop at the first gap; and the second hoop further comprises a second gap; a first end of the second hoop being on one side of the second gap; a second end of the second hoop being on the opposite side of the second gap; and second means joining the first and second ends of the second hoop at the second gap.

In a first alternative embodiment of the first and second means of the respective first and second hoops, the first means comprises a first weld; and the second means comprises a second weld.

In a second alternative embodiment of the first and second means of the respective first and second hoops, the first means comprises a first ioop mounted on one side of the first gap; a second loop mounted on the opposite side of the first gap, with the first and second loops of the first hoop being oriented generally transverse to the plane of the first hoop; and a first bolt extending through the first and second loops for drawing together the first and second loops at the first gap and thereby tightening the first hoop against the associated pipe. The second means comprises a third ioop mounted on one side of the second gap; a fourth loop mounted on the opposite side of the second gap; the third and fourth loops of the second hoop being oriented generally transverse to the plane of the second hoop; and a second bolt extending through the third and fourth loops for drawing together the third and fourth loops at the second gap and thereby tightening the second hoop against the associated pipe.

In yet another aspect, the present invention is embodied in a pipe assembly, comprising: first and second metal pipes having respective first and second ends; first and second plastic cuffs embedding the first and second pipe ends, respectively, each cuff forming a shoulder, the first and second cuffs having a tongue and groove, respectively, adapted for mating when the first cuff is inserted into the second cuff; first and second wire hoops mounted around the first and second pipe ends, respectively; and a plurality of fasteners extending between the hoops and clamping the hoops against the shoulders and the first and second pipe ends against the first and second cuffs.

BRIEF DESCRIPTION OF THE DRAWINGS

The present invention is described with respect to the following drawings.

FIG. 1 is a perspective view of a pipe assembly in accordance with an embodiment of the present invention.

FIG. 2 is an exploded view of components of the pipe assembly of FIG. 1, including two pipes or pipe sections, prior to joinder using the coupling of FIG. 1, and wire hoops and plastic cuffs that are components of the coupling.

FIG. 5 depicts a cross section through the lips of the cuffs that are mounted on the pipe ends, and schematically shows the mating of the cuffs as the pipe assembly of FIG. 1 (also FIG. 2) is being formed.

FIG. 6 is a perspective view, in the manner of FIG. 1, of a pipe assembly in accordance with another embodiment of the present invention, one using bolted wire rings or hoops.

DETAILED DESCRIPTION

Figure 4:
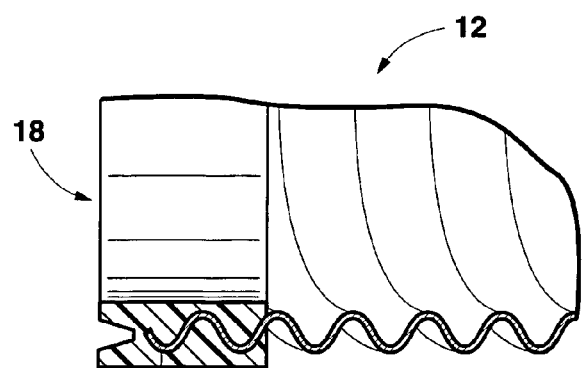
FIG. 4 depicts an end of one of the pipe sections of FIG. 1 that is cut away to effect a cross-section view showing the shape of the cuff and the mounting of the cuff on the pipe end.

FIG. 1 depicts a pipe assembly 10 comprising sections spiral corrugated pipes or pipe sections 11 and 12 which are joined by coupling 13, and FIG. 2 depicts the pipe sections of FIG. 1 prior to assembly. The illustrated pipe section 11 comprises spiral corrugations 14 and has a cuff 15 formed on end 16 thereof. The pipe section 12 comprises corrugations 14 and has cuff 18 formed on end 19 thereof. The invention is also applicable to smooth wall pipe.

The mating cuffs 15 and 18 have tongue and groove configurations, respectively. See FIG. 5. Preferably, cuffs 15 and 18 are formed of plastic material such as polyethylene. The cuffs 15, 18 are molded in place with formed tongue and groove. The pipe ends 16, 19 are embedded in the molded plastic cuffs.

Figure 3:
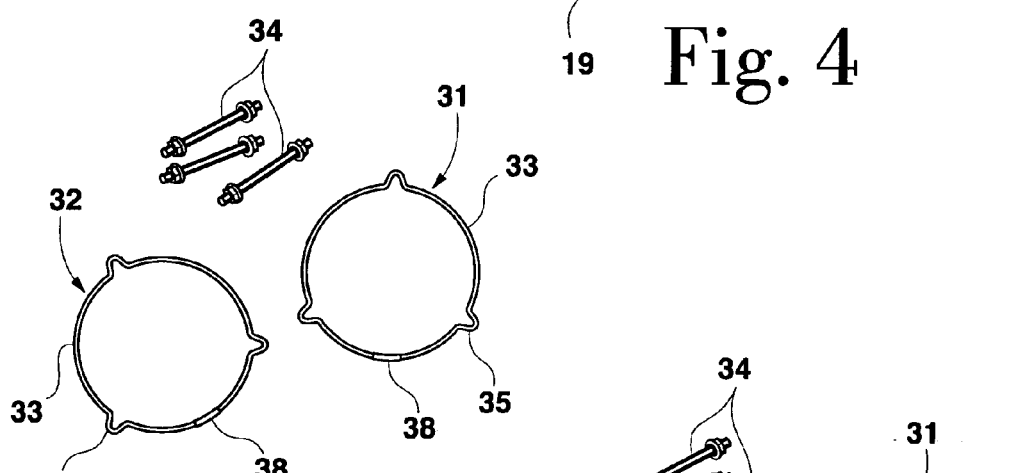
FIG. 3 depicts components of the coupling of FIGS. 1 and 2, in particular the wire hoops and bolts of the coupling.

The couplings 13 include wire hoop assemblies 31 and 32 (also called wire wraps), which are depicted separately in FIG. 3 and are shown mounted on the mating pipe sections 11 and 12, respectively, in FIGS. 1 and 2. In the depicted embodiment, the couplings 13 comprise cuffs 15 and 18 and hoop assemblies 31 and 32, although components of different size and/or shape can be used. As shown, hoop assemblies 31 and 32 can be identical or similar.

The illustrated hoop assemblies 31 and 32 comprise generally circular wire hoops 33 having one or more (typically a plurality of) bolt-receiving peripheral loops 35—35 formed integrally with or joined to the associated hoop and lying generally in the plane of the associated hoop for receiving fasteners such as bolts 34. The illustrated bolts 34 are oriented approximately parallel to the longitudinal axis of the pipe and are used to tighten or clamp the pipe sections axially, illustratively generally parallel to the longitudinal axis, for clamping and compressing the cuffs and securely joining the pipe sections 11 and 12 to one another via the cuffs. See FIGS. 1 and 6.

The hoop assemblies 31 and 32 depicted in FIG. 3 are welded, that is, the hoops 33 are formed with a gap and the ends of the hoop at the gap are joined together by a weld 38, typically after the hoops are mounted on the pipe ends 16 and 19.

However, the hoops 33 can be mounted on the pipe ends either before or after the cuffs 15 and 18 are applied, but are conveniently mounted on the pipe ends in the shop before the cuffs are applied and the ends are assembled. See FIG. 2.

As shown in FIG. 2, the cuffs 15 and 18 can be formed with shoulders or lips 39 against which the hoops 33 are seated. The shoulders permit the use of hoops of a size such that the hoops fit snugly on the pipes but are sufficiently loose to permit rotation for alignment with one another.

Figure 7:
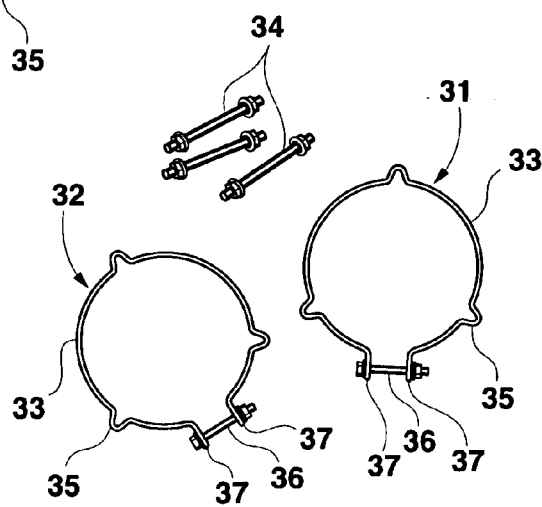
FIG. 7 depicts components of the coupling of FIG. 6, in particular, the wire hoops and bolts of the coupling.

FIGS. 6 and 7 depict an alternative set of wire hoop assemblies 31, 32. Each of the hoops 33 illustrated in FIG. 7 has a gap therein and a bolt loop 37 formed or attached at each end of the hoop adjacent the gap. The loops 37 extend transverse to the plane of the associated hoop in the illustrated embodiment, preferably along planes approximately radial to the associated hoop so that a bolt 36 can be inserted through the loops for tightening the hoop against the pipe periphery to securely mount the hoop on the pipe. The bolts 36 can be loosened to permit rotation of one or both hoops around the pipe to align the hoops and the loops 35 thereof for insertion and tightening of the bolts 34. See FIG. 6.

In one suitable sequence for joining the pipe sections 11 and 12, prior to or after forming the cuffs, the hoop assemblies 31 and 32 are positioned on the ends 16 and 19 of the respective pipe sections 11 and 12 and are secured by means such as the welded joints 38, FIGS. 1 and 3, or the bolts 36, FIGS. 6 and 7. The cuffs 15 and 18 are formed on the pipe ends 16 and 19 of the pipe sections 11 and 12. The alignment of the hoops 33 is adjusted as necessary (by simply rotating the welded version, or in the case of the bolted version, by loosening the nuts mounted on the ends of bolts 36 as required to permit rotation of one or both hoops, and then tightening the bolts as required) to align the loops 35 of hoop assembly 31 with the loops 35 of hoop assembly 32. Bolts 34—34 are inserted through the aligned pairs of loops 35—35 and nuts are threaded onto the ends of each bolt and threaded further onto the bolt to tighten the pipe ends 16 and 19 against the cuffs 15 and 18. This tightening of the bolts 34 securely joins the pipe sections together and compresses the cuffs 15 and 18 together and against the pipe ends to provide a positive, leak-proof, corrosion-resistant joint.

The couplings 13 are readily mounted on the pipe sections, readily aligned, and readily removed, and the alignment is readily adjusted. The process of coupling is accomplished using bolts, nuts and either welded wire rings/hoops or bolted wire rings/hoops, or equivalent simple hardware. In addition, despite the simple, inexpensive, easy-to-use structure and construction, the couplings provide secure, leak-proof joinder of the pipe sections.

In an alternative to loops which are formed integral with the wire hoops 33, the loops 35 and/or 37 can be separate members which are bolted or welded to the hoops.

As described, for spiral corrugated metal pipe, the present invention is embodied in wire wraps using means such as welds or bolts to hold the wires on the pipe ends and bolts to pull and hold the two pipe ends together to form a positive joint with the cuffs.

As alluded to above, the present invention is also applicable to other types of pipes, including smooth wall pipes and the wire wraps can be placed on the pipes prior to placing other materials such as cuffs on the pipe ends.

As indicated above, the sealing gaskets or cuffs according to the present invention are molded onto smooth or corrugated pipe ends, and embed the bare, cut-off pipe ends in a protective cocoon of plastic which provides corrosion protection. Molded plastic can be formed by rotating the associated pipe end and laying on extruded plastic bead around the circumference of the pipe end. Then the excess material built up on the end can be folded over into the interior of the pipe. After set up, the resulting plastic "globs" are machined to provide neater looking end(s). Care is taken not to place too much material into the interior diameter of the pipe, because excess material can impede and restrict flow within the pipe.

Preferably, to form the cuffs used here, inside and outside mold dies are used. Molten or semi-molten plastic is extruded to fill the void between the inside and outside dies, then under pressure the dies clamp and push the semi-molten extruded material into the cavities in the mold dies to create the tongue and groove profile or other selected profiles. The use of inside/outside dies under pressure moves the necessary plastic material to the outside of the pipe and a reduced amount of material to the inside diameter of the pipe sufficient to embed the pipe end and provide the necessary corrosion protection.

In one of the pipe forming techniques used by the assignee, three layer polyethylene is coated onto a metal strip, top and bottom, before the strip is formed into smooth wall or corrugated pipe. Such a plastic coated pipe is compatible with plastic welding and plastic welding to a variety of profiles and with a variety of cuffs and other plastic components of couplings.

Figure 8:
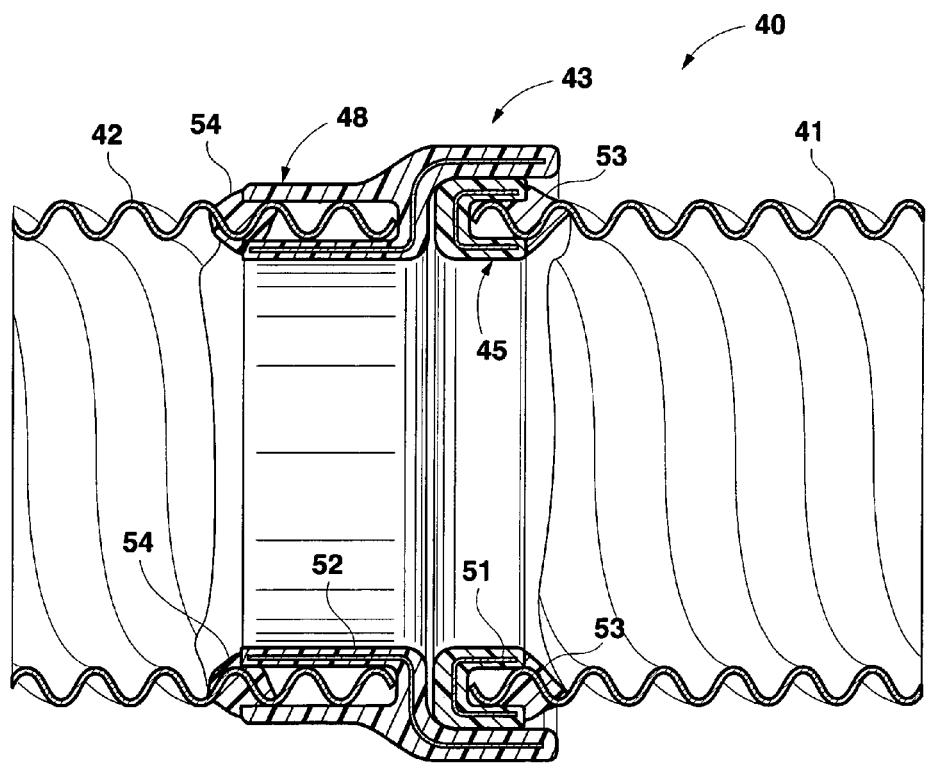
FIG. 8 is a cross section representation of yet another embodiment of the present invention, a pipe assembly incorporating a bell and spigot coupling.

One such profile is used in pipe 40, FIG. 8. This figure depicts a bell and spigot coupling 43 which joins corrugated pipe sections 41 and 42. The coupling 43 comprises a plastic cuff formed by spigot section 45 and bell section 48. The cuffs optionally and preferably include metal cores 51 and 52. The spigot and bell cuff sections 45 and 48 are formed on the corrugated pipe ends 41 and 42 as described above. The spigot section 45 and the bell section 48 are joined to their respective pipe ends by joints 53 and 54. Conveniently, when plastic coated pipes are used, as described above, these joints are plastic welds. Other types of joints can be used, such as bolts or rivets, but plastic welds are preferred. Also, wire hoops such as or similar to 31 and 32 can be used to augment the couplings 43 and can be used in conjunction with cuffs having shoulders similar to the shoulders 39, FIG. 2. The couplings 43 are applicable to a variety of pipes and pipe sizes.

Having thus described pipe couplings, pipe assemblies using the couplings and methods for forming and installing the couplings, all in accordance with the present invention, those of usual skill in the art will adapt the invention to other embodiments and derive other embodiments, limited solely by the claims appended hereto.

What is claimed is:

1. A pipe assembly, comprising: first and second corrugated metal pipes having respective first and second longitudinal axes and respective first and second ends; a first plastic cuff molded formed along the periphery of the first pipe end and embedding the first pipe end therein and a mating second plastic cuff formed along the periphery of the second pipe end and embedding the second pipe end therein; each of the first and second cuffs comprising a shoulder formed around the periphery of the associated first and second pipes; the first plastic cuff comprising a tongue, the second plastic cuff comprising a groove, and the first and second cuffs forming a mating tongue and groove joint peripherally spanning the first and second pipe ends; and fastening means spanning the first and second shoulders and abutting the first and second shoulders, the fastening means drawing the first and second pipe ends together axially and thereby sealing the first and second pipe ends along the tongue and groove joint.

2. The pipe assembly of claim 1, the fastening means comprising:
first and second hoops mounted around the first and second pipe ends, respectively, and abutting the first and second shoulders, respectively; each hoop comprising a plurality of holes or loops spaced apart around the hoop at intervals selected for aligning the holes of the first and second hoops by rotating the hoops about the longitudinal axes of the first and second pipes; and
a plurality of bolts extending between the hoops and through the aligned holes thereof for clamping the hoops against the shoulders thereby drawing the first and second pipe ends together axially and sealing the first and second pipe ends along the tongue and groove joint.

3. The pipe assembly of claim 2,
the first hoop further comprising therein a first gap; a first end of the first hoop being on one side of the first gap; a second end of the first hoop being on the opposite side of the first gap; and first means joining the first and second ends of the first hoop at the first gap; and
the second hoop further comprising therein a second gap; a first end of the second hoop being on one side of the second gap; a second end of the second hoop being on the opposite side of the second gap; and second means joining the first and second ends of the second hoop at the second gap.

4. The pipe assembly of claim 3, the first means comprising a first weld; and
the second means comprising a second weld.

5. The pipe assembly of claim 3:
the first means of the first hoop comprising a first loop mounted on one side of the first gap and a second loop mounted on the opposite side of the first gap; the first and second loops of the first hoop being oriented generally transverse to the plane of the first hoop; and a first bolt extending through the first and second loops for drawing together the first and second loops at the first gap and thereby tightening the first hoop against the associated pipe; and
the second means of the second hoop comprising a third loop mounted on one side of the second gap and a fourth loop mounted on the opposite side of the second gap; the third and fourth loops of the second hoop being oriented generally transverse to the plane of the second hoop; and a second bolt extending through the third and fourth loops for drawing together the third and fourth loops at the second gap and thereby tightening the second hoop against the associated pipe.

6. A pipe assembly, comprising: first and second metal pipes having longitudinal axes and respective first and second ends; a first plastic cuff formed along the periphery of the first pipe end and a second plastic cuff formed along the periphery of the second pipe end, the first and second cuffs having a tongue and a groove, respectively, with the first, tongue cuff inserted into the second, groove cuff; first and second wire hoops mounted over the first and second pipe ends; and a plurality of bolt fasteners for tightening the first and second hoops and the first and second pipe ends axially, to seat the first and second pipe ends against the first and second cuffs, seat the first and second cuffs against one another, and seal the pipe ends against the cuffs.

7. A pipe assembly, comprising:
first and second metal pipes having respective first and second ends;
first and second plastic cuffs embedding the first and second pipe ends, respectively, each cuff forming a shoulder, the first and second cuffs having a tongue and groove, respectively, adapted for mating when the first cuff is inserted into the second cuff;
first and second wire hoops mounted around the first and second pipe ends, respectively; and
a plurality of fasteners extending between the hoops and clamping the hoops against the shoulders and the first and second pipe ends against the first and second cuffs.

8. Components for a composite metal and plastic pipe assembly, comprising:
first and second metal pipes having longitudinal axes and respective first and second ends;
a first plastic cuff embedding the first pipe end and a second plastic cuff embedding the second pipe end, the first and second cuffs having a tongue and a groove, respectively, adapted for mating when the first cuff is inserted into the second cuff;
first and second wire hoops of size and configuration adapted for mounting over and engaging the first and second pipe ends, respectively; and
a plurality of fasteners adapted for clamping the first and second hoops and the first and second pipe ends axially.

9. A method for fastening and sealing first and second pipes at respective first and second ends thereof, the method comprising: shoulder, the first and second cuffs having a tongue and groove, respectively, adapted for mating when the first cuff is inserted into the second cuff, each cuff having a shoulder, assembling a first hoop around the first pipe end adjacent the shoulder of the first cuff and a second hoop around the second pipe end adjacent the shoulder of the second cuff; and clamping the first and second hoops together generally axially along the first and second pipes, thereby clamping the hoops against the shoulders and the first and second pipe ends against the first and second cuffs.

* * * * *

UNITED STATES PATENT AND TRADEMARK OFFICE
CERTIFICATE OF CORRECTION

PATENT NO. : 7,083,204 B1  Page 1 of 1
APPLICATION NO. : 10/806678
DATED : August 1, 2006
INVENTOR(S) : Robert F. Miller and Daniel D. Freitas It is certified that error appears in the above-identified patent and that said Letters Patent is hereby corrected as shown below:

Column 5, line 57, Claim 1, in the phrase "plastic cuff molded" delete "molded".

Column 8, line 10, Claim 9, delete "shoulder" and insert --embedding the first and second pipe ends in respective first and second cuffs--.

Signed and Sealed this

Sixth Day of November, 2007

JON W. DUDAS
*Director of the United States Patent and Trademark Office*